(12) United States Patent
Ray (10) Patent No.: US 7,788,272 B2
(45) Date of Patent: Aug. 31, 2010

(54) DOCUMENT CATALOG SYSTEM

(75) Inventor: Elton Tarik Ray, Lakeville, NY (US)

(73) Assignee: Xerox Corporation, Norwalk, CT (US)

( * ) Notice: Subject to any disclaimer, the term of this patent is extended or adjusted under 35 U.S.C. 154(b) by 252 days.

(21) Appl. No.: 11/462,484

(22) Filed: Aug. 4, 2006

(65) Prior Publication Data
US 2008/0033916 A1  Feb. 7, 2008

(51) Int. Cl.
G06F 7/00 (2006.01)
G06F 17/30 (2006.01)

(52) U.S. Cl. .................. 707/758; 707/783; 705/54; 705/902

(58) Field of Classification Search .................. None
See application file for complete search history.

(56) References Cited

U.S. PATENT DOCUMENTS

| | | | |
|---|---|---|---|
| 5,390,297 A * | 2/1995 | Barber et al. | 726/29 |
| 6,385,614 B1 * | 5/2002 | Vellandi | 707/9 |
| 2004/0117784 A1 * | 6/2004 | Endoh | 717/169 |
| 2005/0055347 A9 * | 3/2005 | Cho et al. | 707/5 |
| 2005/0063612 A1 | 3/2005 | Manber et al. | |
| 2005/0063615 A1 | 3/2005 | Siegel et al. | |
| 2005/0125722 A1 * | 6/2005 | Mistry et al. | 715/513 |
| 2005/0240575 A1 | 10/2005 | Iida | |
| 2005/0289127 A1 * | 12/2005 | Giampaolo et al. | 707/3 |
| 2006/0167946 A1 * | 7/2006 | Hellman et al. | 707/104.1 |
| 2007/0150442 A1 * | 6/2007 | Chin et al. | 707/3 |

FOREIGN PATENT DOCUMENTS

| | | |
|---|---|---|
| WO | WO 01/29732 | 4/2001 |
| WO | WO 2005/031526 | 4/2005 |

OTHER PUBLICATIONS

"Ebrary Full-Text Book Databases and More", pp. 6.
http://library.open.ac.uk/, Library Home>Welcome to Open Library, printed Jun. 8, 2006: p. 1.
http://library.open.ac.uk/libraries/update/access_acdem.html, Access to Acädemic Libraries for Open University Users, printed Jun. 8, 2006: pp. 2.
http://library.open.ac.uk/resources/ebooks.html, Electronic Books (E-Books), printed Jun. 8, 2006: pp. 8.

* cited by examiner

Primary Examiner—Khanh B Pham
Assistant Examiner—Azam Cheema
(74) Attorney, Agent, or Firm—Pepper Hamilton LLP (57) ABSTRACT

A method for open-text searching of information sources owned by a library is provided. The method uses existing full-text search engines and databases of open-text scans of text documents to provide searches which are limited to the actual set of information sources owned by or within a physical library. This set of information sources may be defined by a listing of ISBN or document identification numbers at an access rights database. Users may access this system from computer terminals within the library, or offsite using a unique library patron identification card. Constraints may be placed on the searches which limit the number of users searching a specific book at one time or the level of search access permitted.

19 Claims, 4 Drawing Sheets

DOCUMENT CATALOG SYSTEM

CROSS-REFERENCE TO RELATED APPLICATIONS

Not Applicable

STATEMENT REGARDING FEDERALLY SPONSORED RESEARCH

Not Applicable

THE NAMES OF THE PARTIES TO A JOINT RESEARCH AGREEMENT

Not Applicable

INCORPORATION-BY-REFERENCE OF MATERIAL ON DISC

Not Applicable

BACKGROUND

1. Technical Field

The disclosure contained herein generally relates to a method for providing an open-text search service of access controlled information sources over a public data network. More specifically, the embodiments disclosed herein relate to open-text searching of information sources over a communications network such as the internet, where the source materials searched are owned by a library and the information resulting from a search query may be viewed on a user device without copyright violation.

2. Description of Related Art

The amount of readily available information on public data networks has increased exponentially for the last five decades. As the amount of available data grows, the problem of managing the information becomes more difficult. Companies like Google™ and Yahoo™ have recently come out with search engines that are accessible over a communications network such as the internet. These search engines allow for multimedia and full-text searching of information sources that have been scanned and indexed. These information sources include sound, image and video files, as well as books, magazines, periodicals, trade journals, newspapers, and almost any source that exists in printed form. One drawback to this publicly available searching is the inability to access the full-text results of the search. Efforts to make this information available to the general public via the internet have been thwarted by publishers and authors who understandably do not want their intellectual property given away for free.

Access to materials at a public library is unrestricted, but the search options are limited. Searching for information sources at a library is typically restricted to the information on a card catalog entry. This information may include the title, author, subject, or call number. A system and method for full-text or multimedia searching of all of the information sources at a library is currently not available, but would greatly improve a library patron's ability to locate relevant resource materials.

Accordingly, what is needed is a method to improve a user's ability to locate resource materials within a library. More specifically, what is needed is a method which allows a user to perform a full-text or multimedia search on the information sources within a library and gain access to the sources located during the open-text search.

The disclosure contained herein describes solutions to one or more of the problems described above.

SUMMARY

An embodiment of the present disclosure includes a method for providing a search service. The method may include receiving a search request for a search property from a user device via a communications network. The search request may include at least one search property and a customer identification. The customer identification may be associated with a customer site, which may be a library, and may specify license rights to information sources stored at or owned by the customer site. The license rights information associated with the customer identification may be stored at an access rights database, which may be accessed to select a set of information sources to search with the search request. Searching of the information sources may occur on an open-text database, and may identify one or more documents that include the search property. A list of these documents may then be delivered to the user device, which may be a computer terminal.

The search results may be delivered as an enumerated list which may include individual list items with at least the information source title, author and publication date. A portion of the individual list items may be selectable and may provide a link to an open-text version of the information source item. After the search results list is delivered to the user device, the user may select an information source from the list to view. The customer identification associated with a set of license rights may be used to determine the number of viewable copies of an information source. This number of viewable copies may then be compared to the number of delivered copies at the customer site to determine whether the user may view the selected copy of the information source. If the number of delivered copies plus the requested copy does not exceed the license rights for that customer site, the user may be provided with a copy of the information source. If the number of delivered copies plus the requested copy does exceed the license rights for that customer site, a message may be delivered to the user device indicating that the selected information source is unavailable. The user request to view a copy of the information source may be placed into a queue to view the source when it becomes available.

The customer site may provide a list of information sources which are available at the site to the access rights database. Items in the list may be identified by ISBN. License rights to additional copies of an information source may be purchased and the list of information sources incremented at the access rights database. The customer site may also provide the user with a user device capable of accessing the communications network.

BRIEF DESCRIPTION OF THE SEVERAL VIEWS OF THE DRAWINGS

Aspects, features, benefits and advantages of the embodiments described herein will be apparent with regard to the following description, appended claims and accompanying drawings where:

DETAILED DESCRIPTION

Before the present methods, systems and materials are described, it is to be understood that this disclosure is not limited to the particular systems, methodologies or protocols described, as these may vary. It is also to be understood that the terminology used herein is for the purpose of describing particular embodiments only, and is not intended to limit the scope of the present disclosure which will be limited only by the appended claims. It must be noted that as used herein and in the appended claims, the singular forms "a," "an," and "the" include plural reference unless the context clearly dictates otherwise. In addition, the word "comprising" as used herein means "including, but not limited to". Unless defined otherwise, all technical and scientific terms used herein have the same meanings as commonly understood by one of ordinary skill in the art.

While the term "user" will be used in the disclosure below, "user" will include reference to any person or persons, such as librarians, library patrons, researchers, customers, and the like, all of which may be used interchangeably and is to represent any individual using the instant invention The use of the term "device", "machine", "computer", "terminal" and "equipment" will be used interchangeably and is to encompass any electromechanical device or system capable of being included on a computer network. The term "Library" is meant to indicate any physical location or building where a user can gain unrestricted access to resource materials in many formats and from many sources. These resource materials or information sources may include books, periodicals, maps, prints or other artwork, microfilm, microfiche, audio tapes, CDs, LPs, video tapes and DVDs, and may also provide public facilities to access CD-ROM and subscription databases and the internet or public data network.

"Full-text" or "open-text" search will be used interchangeable and refers to a technique of searching a computer stored document or database. An open-text search may examine all or a large number of the words in every document in a database to locate matches with the specified search words or phrases of a search request. An open-text search as used herein may also refer to examining all or a large portion of images, video, music, or any other information source that may be stored in electronic form for properties which match a search request. A "search propery" may be several characters, a single word or a combination of words such as a phrase or sentence, or metadata associated with image, video or sound information sources. The characters of a search property may also be used in optical character recognition to identify image or video sources which may contain characters. A search property as used herein may also refer to any small portion of an image or sound file which may be used for searching image, video or music sources using shape, pattern, color, tone recognition, or the like.

"Mac address" refers to a Media Access Control address which is a unique identifier attached to most forms of networking equipment. As used herein, "Mac address" may be used to refer to any unique identifier attached to networking equipment. "ISBN" refers to the International Standard Book Number which is a unique identifier for books. "ISBN" and "Document identifier number" as used herein will be used interchangeably and may be taken to mean any unique identifier for a document. A "library classification" or "card catalog" system as used herein is a system of coding and organizing library materials according to their subject, title, author, or publication date.

This disclosure is generally related to a method for replacing existing library card catalog systems with an electronic, open-text based search system. A service provider may scan hard copy books, images and other information sources and index them for open-text searching. The service provider may also make available a database which maintains information on the list of resources within or owned by a library. A library may subscribe to or implement the service and offer access to the service for its patrons. A library patron may access the service to send a search request for a word, a phrase, or an electronic property. The search request received by the service would execute an open-text search on only those information sources located at or owned by the subscribing library, thus mimicking the behavior of a traditional card catalog. Providing this service to libraries for their specific collection of information sources may supplant current card catalog systems, electronic or otherwise, as a means of searching and providing deeper search capabilities to library patrons while ensuring that copyright holders have been legitimately compensated.

Libraries may upload their list of information sources to such a service and restrict access to the service to only a small subset of computers located within the library. Alternatively, library patrons may use their unique library patron card (library card) as identification to gain access to the system from computer terminals not located within the library. The service would limit the search set to only the books and information sources the library owns or has licensed. In order to honor the copyright holders' rights, library patrons may be restricted from actually reading, viewing or listening to the entire information source unless the source is available for check-out. A source which is not available for checkout is one which is being accessed by another library patron.

Access to this service may be made via an access rights database which stores customer information. The customer identification may be a single identification for an entire library, may be the Mac address or addresses of the user devices within the library, may be information from the individual library patron's card, or some combination thereof. Publishers may offer supplemental licenses to the library on demand and for a fee to use additional copies of copyrighted materials. In this later case, more patrons may be able to view a single information source at one time.

The advantages of such a system and method include faster, more comprehensive searching using the open-text of the information sources rather than simply the title, subject, and author as are used in standard library card catalog systems.

Figure 1:
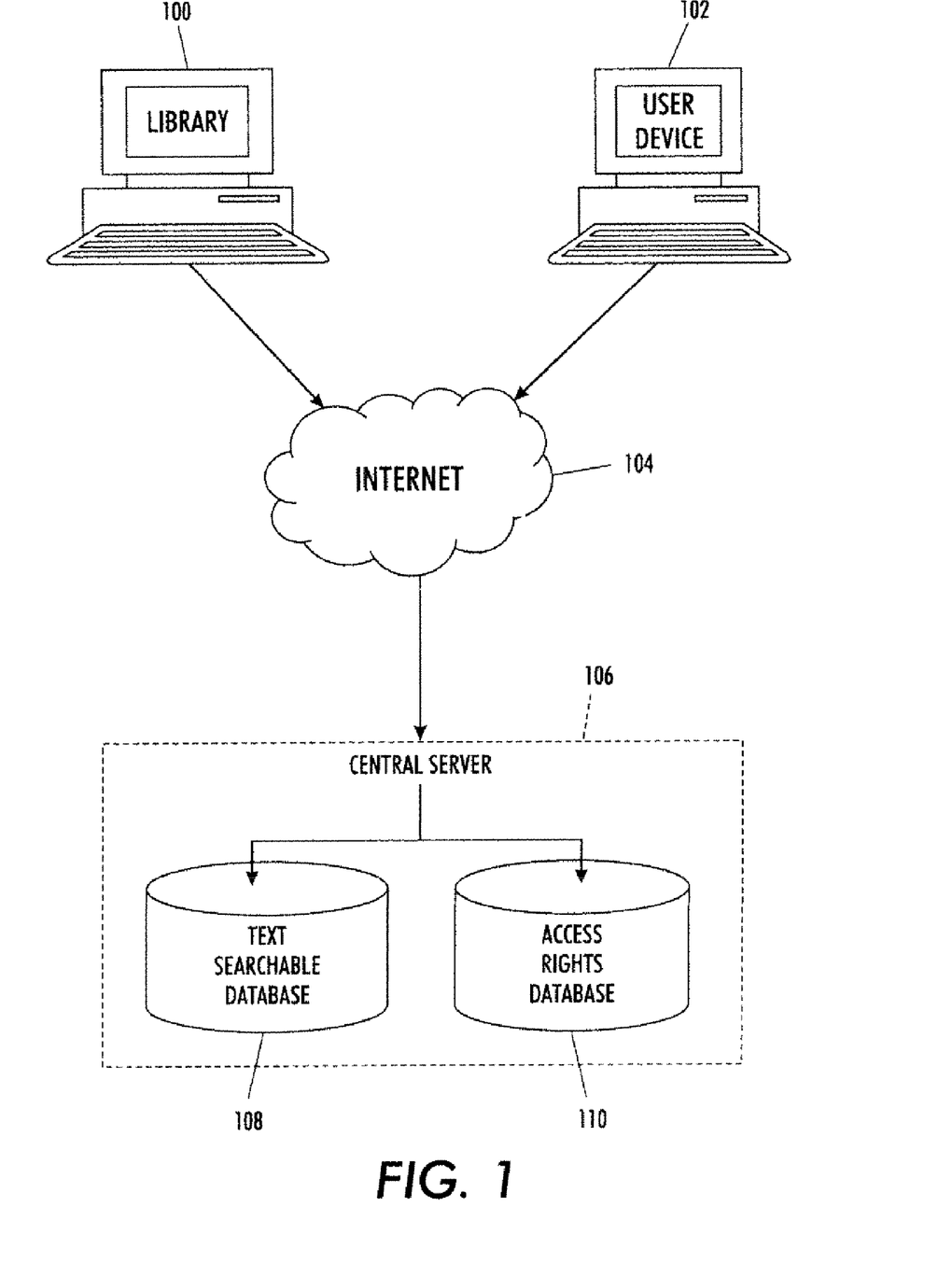
FIG. 1 depicts a high level system diagram according to an embodiment.

Turning now to the figures, FIG. 1 is a high level system diagram according to an embodiment. A library 100 may upload a list of information sources which are owned by the library and stored at the library location. This information is communicated via a communications network 104, and is stored at an access rights database 110. Each library may have a unique customer identification code (ID) which is associated with the list of information sources. This unique customer identification may be a single code for the specific library, may be the Mac address of the computer or computers located within the library which are used to access the service, or may be information stored on the library patrons' library cards.

A patron of this library may access the same communications network 104 via a user device 102 located within the library building. Alternatively, the library patron may access the service from an offsite user device or computer terminal using their library card as identification. The library patron sends an open-text search request from the user device 102 via the communications network 104 to a central server 106. The open-text search request is associated with a customer ID which allows the access rights database 110 to select a subset of information sources which may be accessed by the open-text searchable database 108. The customer identification may be a single identification for an entire library, may be the Mac address or addresses of the user devices within the library, may be information from the individual library patron's card (library card), or may be some combination thereof.

Figure 2:
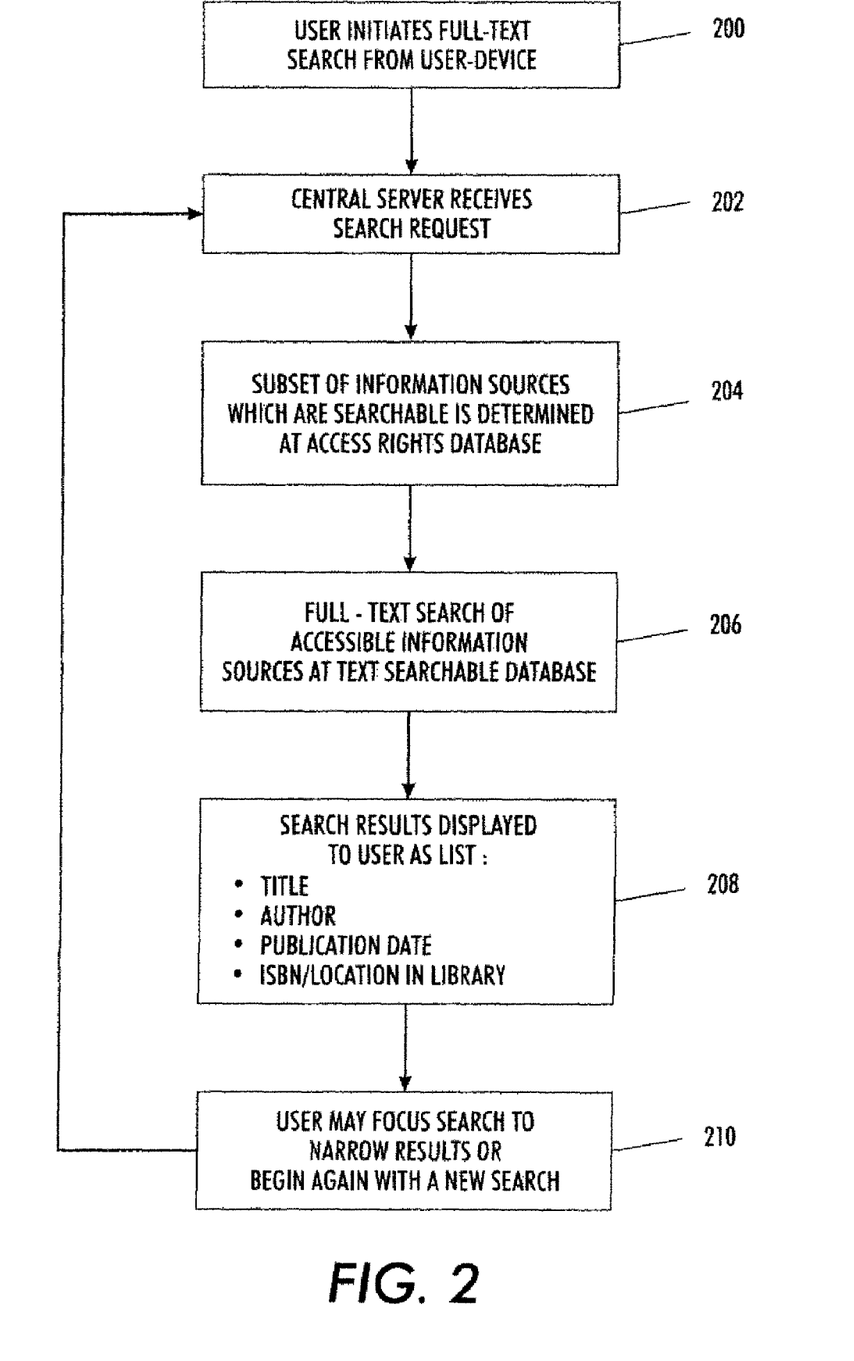
FIG. 2 depicts a flow diagram describing one embodiment of a process for performing an open-text search.

FIG. 2 depicts a flowchart which demonstrates exemplary steps that may be involved in open-text searching by a library patron. The library patron initiates an open-text search from a user device, as depicted in block 200. The user device may be any system capable of being connected to a communications network, but is most commonly a computer terminal. This search request is received by a central server, as depicted in block 202, and the subset of information sources that the library patron may access is determined by the access rights database, as depicted in block 204. This subset of accessible information may be books, magazines, or any other printed material available at, owned by, or licensed to the library location where the patron initiated the open-text search. The subset of accessible information may also include images, videos, or sound recording which are available at, owned by, or licensed to the library location where the patron initiated the open-text search. An open-text search is then performed at the open-text-searchable database, as represented in block 206, using the phrase, words, or electronic properties of the search request. Results of the open-text search are delivered to the user device and displayed as a list, as depicted in block 208. This list may include the title author, and publication date of the information source. If the information source is a book, the list may also include the ISBN. Other defining characteristics of the information source may also be included in the list, such as publisher, editor, and number of times the text or electronic property of the search request is found in the information source. If an information source is not available on the open-text-searchable database, or has not been scanned and indexed, the contents of a standard library card catalog may be displayed. The library patron may now choose to narrow the focus of the search by adding words to the phrase or by adding additional electronic properties to the search request, may initiate a new search, or may choose to request that an open-text version of the information source be delivered and displayed, as represented in block 210.

Open-text search requests may include a string of characters, single words, entire phrases, or electronic search properties. These requests may use wildcard characters (such as *; as in Bridg* which would return any source containing words that have the string of letters 'bridg'), Boolean operators (such as AND, OR, NOT; as in London AND Bridge which returns any source that contains the words London and bridge), or Proximity operators (such as "London Bridge"; which will return sources that contain the words London Bridge next to each other). Once a search request is executed and a list of information sources is delivered to and displayed on the user device, the library patron may select an information source to view by clicking on the title of the source or any other selectable region associated with a results list item. The library patron may further refine the search if the number of information sources in the list is overly large by adding words, phrases, or search properties to the search request. The library patron may further decide to initiate a new search, or terminate the search session.

In an embodiment of the instant disclosure, there are many different ways the search results list may be navigated. These include re-sorting of the search results by information characteristic, such as by publication date, author name, subject heading or the like. The sorting may be based on alphabetical order of an information characteristic, such as for author name, subject heading, or publisher for example. The sorting may also be based on relevance of list result, where a more relevant result may have a larger number of times the search property was located in the information source. The complete search list may be navigated using previous and next buttons, scroll bars, by page number, or other navigation techniques. The results list may also display the number of information sources that match the text or electronic property of the search request, and an enumerated list of the information sources. The list may include the title of the information source, which may provide a link to a small section of the source where the text of the search request is located. This may be displayed by clicking on the title to link to a new page which displays the section. If the open-text version is not currently accessed by another library patron, the link may also display a open-text version of the information source. This open-text version may be displayed in a new window on the user device and may be navigated page by page.

Figure 3:
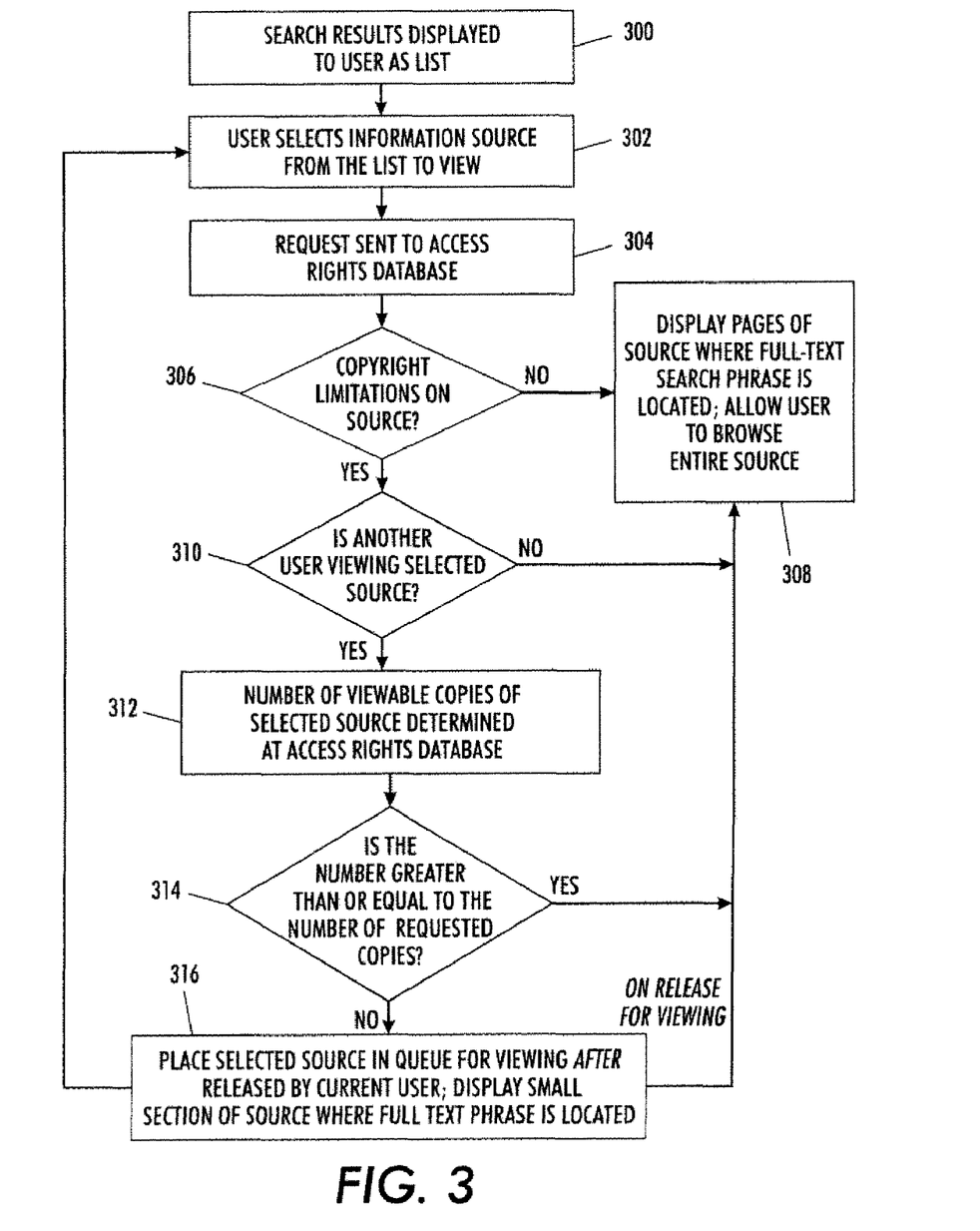
FIG. 3 depicts a flow diagram describing one embodiment of a process for viewing an information source located by an open-text search.

FIG. 3 depicts a flowchart which demonstrates exemplary steps involved in displaying the open-text version of an information source on the user device. After the list of results of an open-text search has been delivered to and displayed on a user device, as depicted in block 300, the library patron may decide to view the open-text of a specific information source, as depicted in block 302. The selection may be made by clicking on the title or any other region associated with that specific information source to link to a new page or screen which displays the source. The request to view the open-text of an information source is sent to the access rights database, as depicted in block 304, where copyright limitations on the information source are determined. If the information source is not copyright protected, as determined in block 306, the open-text will be delivered to and displayed on the user device, as depicted in block 308. Delivery of the open-text version of the information source may include the entire information source, or some portion thereof. For example, the delivery of the open-text version of a book may be by page, chapter or may be the entire book, whereas delivery of the open-text version of a video may be by image, scene or may be the entire video.

For information sources that are copyright protected, as determined in block 306, the access rights database may determine if another library patron is accessing the source, as shown in block 310. If no other library patrons are accessing or viewing the requested information source, the open-text may be delivered to and displayed on the library patron's device, as shown in block 308. It on the other hand, a second or third library patron is viewing the open-text of the requested information source, customer identification information stored at the access rights database may be used to determine whether the library has rights to display a second or third copy of the information source, as shown in block 312. If the number of copies of the information source available for access is greater than the number of copies requested for viewing, as determined in block 314, the information source will be delivered to and displayed on the user device of the library patron, as shown in block 308. If the number is not equal to or larger than the requested number of copies, as determined in block 314, the information source will be placed in a queue for viewing after released by the previous library patron, as shown in block 316. A small section of the information source may be displayed. This small section may be a few sentences which include the text of the search request, or a single page where the text of the search request was located. The small section may also be a small portion of an image, video or sound file. Several sections may also be display or navigated.

In an embodiment of the instant disclosure the library patron may further refine the search results using a filter. These filters may include focusing the search results by words or phrases found within the title or subject classification of an information source. The results may also be refined by selecting a specific time period of publication dates of the information source from which to search. Combinations of such filters may be used to reduce the number of search results.

In an embodiment of the instant disclosure, limits may be placed on the amount of time a library patron is allowed to view or access the open-text version of an information source. Access to the open-text version of an information source may be treated in a manner similar to check-out of the actual physical copy of the text, where due dates are used to encourage proper return of an information source.

Figure 4:
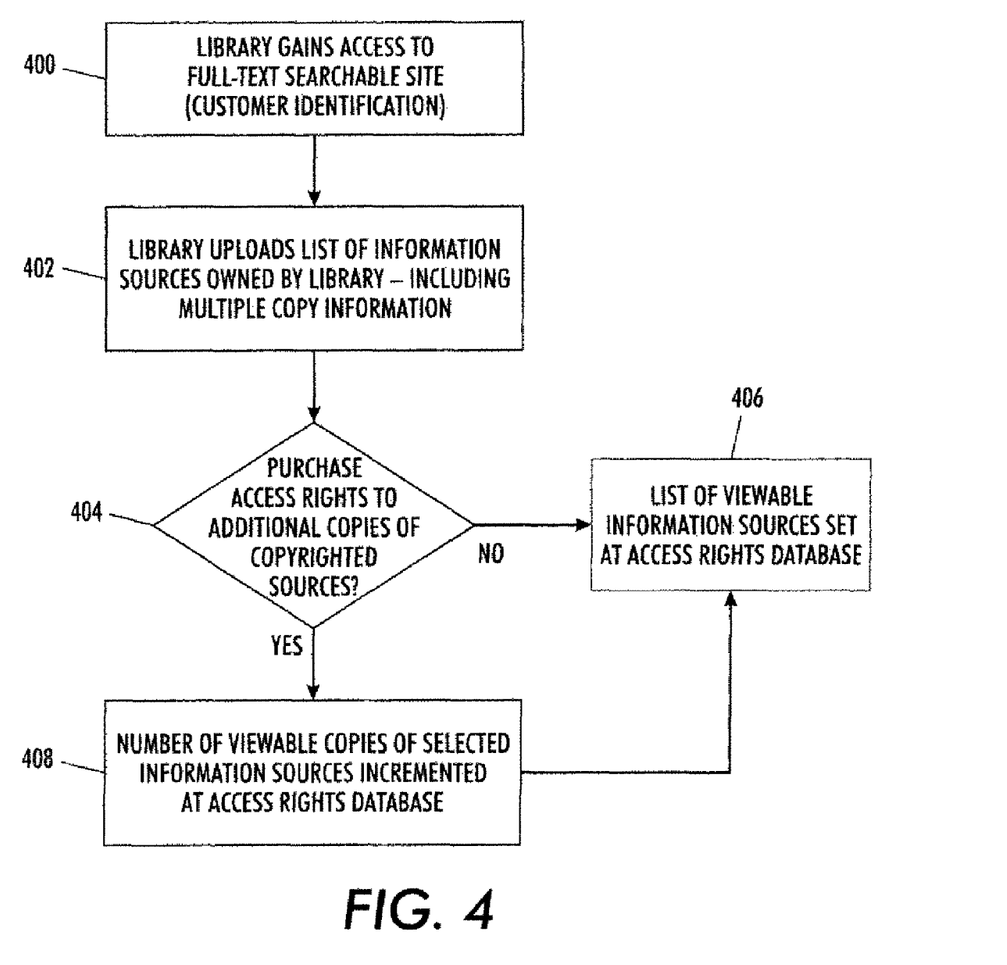
FIG. 4 depicts a flow diagram describing one embodiment of a process for uploading a list of information source materials.

The library creates the list of information sources that library patrons may access and updates this list regularly. A flowchart demonstrating exemplary steps in this process is shown in FIG. 4. The library may gain access to an open-text searchable site, as shown in block 400 (also shown as the central database 106 in FIG. 1) using a customer identification number. The library may upload a list Of information sources owned by and located at the library, as depicted in block 402. This list may include information on the number of copies of each information source. This list of information sources is set at an access rights database, as depicted in block 406, and is used to define the information sources that may be searched in the future by patrons of that library. The library may also choose to purchase supplemental licenses for a fee to use additional copies of copyrighted materials, as determined in block 404. In this later case, more patrons may be able to view a single information source at one time. The number of viewable copies of an information source is then incremented, as depicted in block 408, and reset at the access rights database, as depicted in block 406.

Embodiments described herein may allow a user to perform open-text searches on information sources and resource materials that are within a given physical location or place. The user may quickly pinpoint information on a particular subject by providing words or phrases in a search request which result in the display of a list of every relevant section of every book in that location. The user may also locate image, video or sound materials using search requests which include single or multiple electronic properties of such materials. These electronic properties may include metadata associated with the image, video or sound files, or may be small portions of image or sounds files which are used for shape or sound matching.

The Examples below are merely representative of the work that contributes to the teaching in the present disclosure and are not considered to be restrictive of the disclosure.

EXAMPLES

Example 1—Open-Text Search for "Sodium Bisulfite"

An example of a. open-text search for the phrase "Sodium Bisulfite" is shown. A library patron who is interested in the properties of sodium bisulfite in wine making may access a computer terminal within the library and perform an open-text search for the phrase "Sodium Bisulfite". The search request is received by the central server and will be performed on the set of information sources within that library as determined by the access rights database. The access rights server may use the Mac address of the user device or a unique customer ID provided at the time of the search request. A list of books that contain the phrase "Sodium Bisulfite" and are located in the library from which the user has performed the search may be returned. The list contains over 1000 information sources, far too many for the library patron to view. The library patron decides to refine the search by adding the work "cook*" to the search phrase. This returns any information source within the originally selected 1000 which also contains the string of characters "cook". A list of five books is returned as follows"

1. *Aflatoxin And Food Safety* by Hamed K Abbas, Abbas K Abbas 2005 ISBN: 0824723031; Shelved in Medical
2. *How to Dry Foods* by Deanna Delong, Laura (EDT) Gates 1992 ISBN: 1557880506; Shelved in Cooking
3. *Darkroom Cookbook* by Steve Anchell 2000 ISBN: 0240804236; Shelved in Photography
4. *Modern Winemaking* by Philip Jackisch 1985 ISBN: 0801414555; Shelved in Cooking
5. *Food: A Culinary History* edited by Jean-Louis Flandrin, Massimo Montanari 1999 ISBN: 0231111541; Shelved in Cooking In this example, these books are all still under copyright protection and the library owns only one copy of each. The library patron may access the open text of the books in this list by clicking on the title of the book. If no other patrons are currently viewing the text of the selected book, the page where the search phrase "Sodium Bisulfite" was located will be displayed on the screen. In this example, the library patron selects the forth book in the list entitled "Modern Winemaking", by Philip Jackisch, and page 53 is displayed showing the first reference to sodium bisulfite:

"The natural sodium concentration in wines is about 35 ppm. Certain additives (eg, sodium bisulfite) increase that figure. Some commercial wineries use ion . . . "

The library patron may scan through the remainder of the currently selected book, may go back to the search list results and select a different book to browse through, may initiate a new search, or may decide to locate the actual physical book within that library. This type of open-text search has allowed the library patron to collect a larger selection of possible reference materials than a simple subject search. In this example, the library patron has located books on winemaking, but also finds that sodium bisulfite may be involved with food preparation or drying, and in darkroom processing, and thus may broaden the scope of his reference materials.

Example 2—Open-Text Search for "Hot Air Balloons"

An example of an open-text search for the phrase "Hot Air Balloons" is shown. A library patron who is interested in hot air balloon rides may access a computer terminal within the library and perform an open-text search for the phrase "Hot Air Balloons". The open-text search request is received by the central server and will be performed on the set of information sources within that library as determined by the access rights database. A list of books that contain the phrase "Hot Air Balloons" and are located in the library from which the user has performed the search may be returned as follows:
1. *Curious George and the Hot Air Balloon* by Margret Rey, H A Rey 1998 ISBN: 0395919096; Shelved in Juvenile fiction
2. *Fundamentals Of Thermal-fluid Sciences* by Yunus A Cengel, Robert H Turner 2004 ISBN: 0072976756; Shelved in Science
3. *Best Hikes with Children in Arizona* by Lawrence Letham 1998 ISBN: 0898865158; Shelved in Travel
4. *Better Takeoffs & Landings by Michael Charles* 1995 ISBN: 0070388067; Shelved in Transportation
5. *Adventures in the Air* by W. de (Wilfrid) Fonvielle No ISBN; Shelved in Historic Texts
6. *To Conquer the Air: The Wright Brothers and the Great Race for Flight* by James Tobin 2003 ISBN: 0684856883; Shelved in History In this example, the first four books are under copyright protection and the library owns only one copy of each. The fifth book in this list is no longer copyright protected, and even though the library owns only one copy, several patrons may simultaneously view the open-text of this book electronically. The library has purchased access rights to a second copy of the sixth book in the list, which is copyright protected. Since the library patron was originally interested in hot air balloons rides, the third book in the list entitled "Best Hikes with Children in Arizona" by Lawrence Letham is selected by clicking on the title. Another patron is currently accessing this book, so the system sends a message to the current patron that this selection has been placed in a queue to be viewed as soon as it is released by the previous patron. The library patron of this example may now select another book from the list to view, may initiate another search, or may decide to locate the physical copy of the book within the library. The patron selects the sixth book in the list entitled "To Conquer the Air: The Wright Brothers and the Great Race for Flight" by James Tobin and finds that this book is electronically accessible, and that the open-text search phrase was located on page 161. The patron may access the open text of this book.

It will be appreciated that several of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for providing a search service, comprising:
   assigning a set of license rights to a customer site;
   storing the set of license rights along with customer information at an access rights database for the customer site;
   receiving a search request for a search property from a user device associated with the customer site via a communications network;
   selecting a set of information sources corresponding to resource materials at the customer site;
   searching the accessible information sources with the search request to identify one or more documents that include the search property;
   determining which documents the user has access rights to view based upon the assigned license rights of the customer site as stored in the access rights database to produce a set of search results;
   delivering the search results to the user device;
   allowing a user to select an information source from the search results;
   determining a number of viewable copies of the information source for which the customer site has license rights based upon the set of access rights stored in the access rights database;
   determining a number of delivered copies of the information source currently being used by other user devices associated with the customer site; and
   providing a copy of the information source to the user device if the number of delivered copies plus the provided copy does not exceed the license rights of the customer site.

2. The method of claim 1, wherein the method also comprises, after the determining the number of viewable copies of the information source:
   delivering a message to the user device that the selected information source is unavailable if the number of delivered copies plus the provided copy will exceed the license rights; and
   placing the user in a queue to view the information source when it becomes available.

3. The method of claim 1, wherein the customer site is a library.

4. The method of claim 1, wherein the user device is a computer terminal.

5. The method of claim 1, wherein the license rights are associated with a customer identification.

6. The method of claim 5, wherein the customer identification is associated with the customer site.

7. The method of claim 5, wherein the access rights database stores a list of information sources which are located at the customer site.

8. The method of claim 1, wherein the search request includes the customer identification and at least one search property.

9. The method of claim 1, wherein searching the information sources occurs on an open-text searchable database.

10. The method of claim 1, wherein delivering the search results is as an enumerated list which includes individual list items with at least the information source title, author, and publication date.

11. The method of claim 10, wherein a part of the individual list item is selectable and provides a link to an open-text version of the information source item.

12. The method of claim 1, further comprising:
   providing a list of information sources available at the customer site to an access rights database.

13. The method of claim 12, wherein items in the list of information sources are identified by ISBN numbers.

14. The method of claim 12, further comprising:
   purchasing license rights to additional copies of an information source; and
   incrementing the list of information sources to reflect an increased number of viewable copies of the information source.

15. The method of claim 1, further comprising:
   providing a user with a user device capable of accessing the communications network.

16. A method for providing a search service, comprising:
   assigning a set of licensing rights to a customer site;
   storing the set of license rights at an access rights database for the customer site;

receiving a search request for a search property from a user device associated with the customer site via a communications network;

selecting a set of information sources corresponding to resource materials at a customer site;

searching the accessible information sources with the search request to identify one or more documents that include the search property;

determining which documents the user has access rights to view based upon the assigned license rights of the customer site as stored in the access rights database to produce a set of search results;

delivering the search results to the user device;

allowing the user to select an information source from the search results;

determining a number of viewable copies of the information source for which the customer site has license rights, wherein the license rights are associated with a customer identification and are stored at the access rights database and wherein the access rights database stores a list of information sources which are located at the customer site;

determining a number of delivered copies of the information source currently being used by other user devices associated with the customer site; and providing a copy of the information source to the user device if the number of delivered copies plus the provided copy does not exceed the license rights of the customer site.

17. The method of claim 16, wherein the method also comprises, after the determining the number of viewable copies of the information source:

delivering a message to the user device that the selected information source is unavailable if the number of delivered copies plus the provided copy will exceed the license rights; and placing the user in a queue to view the information source when it becomes available.

18. The method of claim 16, wherein delivering the search results is as an enumerated list which includes individual list items with at least the information source title, author, and publication date.

19. The method of claim 16, wherein the search request includes at least one search property and the customer identification and wherein the customer identification is associated with the customer site.

* * * * *